United States Patent
Abbott et al.

(10) Patent No.: US 10,036,885 B2
(45) Date of Patent: Jul. 31, 2018

(54) ULTRA-FAST MECHANICAL SHUTTER

(71) Applicants: CALIFORNIA INSTITUTE OF TECHNOLOGY, Pasadena, CA (US); MASSACHUSETTS INSTITUTE OF TECHNOLOGY, Cambridge, MA (US)

(72) Inventors: Richard Abbott, Altadena, CA (US); Peter Fritschel, Cambridge, MA (US)

(73) Assignees: CALIFORNIA INSTITUTE OF TECHNOLOGY, Pasadena, CA (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 229 days.

(21) Appl. No.: 14/711,466

(22) Filed: May 13, 2015

(65) Prior Publication Data

US 2015/0331232 A1    Nov. 19, 2015

Related U.S. Application Data

(60) Provisional application No. 62/000,124, filed on May 19, 2014.

(51) Int. Cl.
*G02B 26/04* (2006.01)
*G02B 26/02* (2006.01)
*G02B 7/182* (2006.01)

(52) U.S. Cl.
CPC .......... *G02B 26/04* (2013.01); *G02B 7/1821* (2013.01); *G02B 26/02* (2013.01)

(58) Field of Classification Search
None
See application file for complete search history.

(56) References Cited

U.S. PATENT DOCUMENTS

2011/0216413 A1 * 9/2011 Yasuda ................. G02B 27/64
359/557

OTHER PUBLICATIONS

1-Wagner, R.E. "Laser drilling mechanics." Journal of Applied Physics, vol. 45, No. 10, pp. 4631-4637. Oct. 1974.
2-Bechtel, J.H. "Heating of solid targets with laser pulses." Journal of Applied Physics, vol. 46, No. 4, pp. 1585-1593. Apr. 1975.

* cited by examiner

*Primary Examiner* — Jennifer D. Carruth
(74) *Attorney, Agent, or Firm* — Steinfl + Bruno LLP

(57) ABSTRACT

An electro-mechanical shutter is described. The fast operation is based on a coil operated via a current, where the coil can move within a set of magnets to provide opening and closing of a shutter. The shutter can comprise a mirror connected to the coil, so that the mirror can be moved into the path of an optical beam. The mirror can block the beam light in the closed state, and allow the beam light in the open state.

17 Claims, 14 Drawing Sheets

ULTRA-FAST MECHANICAL SHUTTER

CROSS REFERENCE TO RELATED APPLICATIONS

The present application claims priority to U.S. Provisional Application No. 62/000,124, filed on May 19, 2014, the disclosure of which is incorporated herein by reference in its entirety.

STATEMENT OF INTEREST

This invention was made with government support under PHY0107417 & PHY0757058 awarded by the National Science Foundation. The government has certain rights in the invention.

TECHNICAL FIELD

The present disclosure relates to mechanical shutters. More particularly, it relates to an ultra-fast mechanical shutter.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
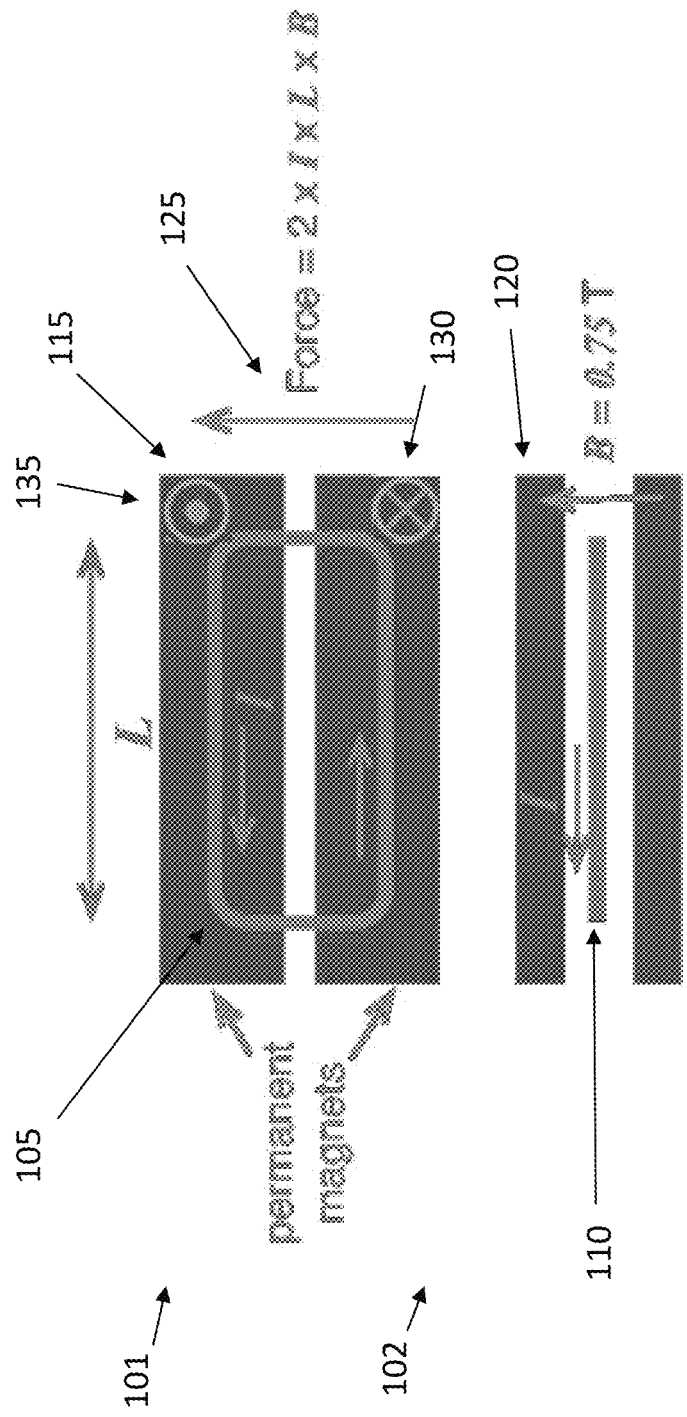
FIG. 1 illustrates the basic physics concepts applied in the fast shutters of the present disclosure.

In a first aspect of the disclosure, an electro-mechanical device is described, comprising: at least one first magnet configured to provide a first magnetic field in a first direction in an upper part of the electro-mechanical device; at least one second magnet configured to provide a second magnetic field in a second direction in a lower part of the electro-mechanical shutter, wherein the second direction is opposite to the first direction; and at least one coil, comprising windings of electrically conducting wires, the at least one coil configured to move between the upper part and the lower part of the electro-mechanical device.

DETAILED DESCRIPTION

The present disclosure describes mechanical shutters. Specifically, ultra-fast mechanical shutters are disclosed. The shutters comprise a mirror, which can reflect optical beams such as laser light. The mirror is attached to a coil, comprising windings of electrical wires, and the coil is within the magnetic field of a set of magnets, for example permanent magnets. When a current is applied to the coil, the coil and attached mirror can move relative to the magnets, due to the electromagnetic interactions between the current in the coil and the magnets. The movement of the mirror can then allow blocking of the optical beam. In this way, an off/on shutter can be realized. By controlling damping in the coil, for example, by setting a specific resistance, the movement of the coil can be controlled accurately. A back up mechanical stop mechanism can also be implemented, in case of malfunctioning of the electromechanical operation.

The fast shutters of the present disclosure can be employed, for example, to protect the photodiodes at the anti-symmetric (AS) port of the Laser Interferometer Gravitational-Wave Observatory (LIGO) interferometer from being damaged by the optical pulse that occurs upon loss-of-lock. LIGO is a large-scale physics experiment aimed at detecting gravitational waves and is a variation of a Michelson interferometer. At LIGO, 'lock' is defined as the condition in which light continues to resonate at high power in the cavities of the interferometer. Disruptions to the optics can misdirect the beam, destroying the resonant condition and rendering the instrument insensitive ("loss-of-lock"). Lock is threatened by mirror movements as small as one atomic diameter. The anti-symmetric port at LIGO is the location adjacent to the beam splitter where the laser interference pattern is measured on photodiodes and where a gravitational wave signal will be recorded.

In a loss-of-lock condition, and at full power operation, the optical pulse that occurs can contain 45 J of energy, in a pulse width of 5 ms, full width half maximum (FWHM). The fast shutter, therefore, can be employed as an electromagnetically actuated mechanical beam block/reflector. Some embodiments of the present disclosure are installed in a part of the LIGO interferometer termed HAM6, mounted between the second and third output beam steering mirrors (OM2 and OM3). In this exemplary use at LIGO, the fast shutter can protect the AS port photodiodes. In some embodiments, for example in the embodiment at LIGO, the shutter, when closed, can reflect the optical pulse into a special beam dump (which can also thus be part of the fast shutter system). The fast shutter can also be referred to, in the present disclosure, as the TOASTR: Turbo Optical Anti-Symmetric Transient Rejector. In other embodiments, the electromagnetic means by which the shutter decelerates under electrical control could make this type of electromechanical device useful in other applications of motion beyond optical beam shuttering.

The above use at LIGO for the fast shutters is exemplary. The fast shutters of the present disclosure may be employed for a variety of purposes where an optical beam needs to be controlled with a fast shutter.

The TOASTR can be employed to protect photodiodes from damage, for example at the anti-symmetric ports at LIGO. Experimental studies of damage to InGaAs diodes from optical pulses are known to the person skilled in the art. In some embodiments, as measured from the InGaAs diode exposure to thousands of identical optical pulses, the maximum safe single-pulse energy, for a beam diameter of 1 mm, is 50 mJ.

Shutter Speed. Simulations of the lock loss transient (time domain) are also known to the person skilled in the art. Such simulations are consistent with the experimental damage limit above. As a consequence, in some embodiments the shutter needs to be 90% closed within 1 ms of being triggered, and 99.9% closed within 2 ms of being triggered. Therefore, in some embodiments, the present disclosure describes fast shutters that can be 90% closed within 1 ms of being triggered and 99.9% closed within 2 ms of being triggered.

Shutter Aperture. In the 'open' state, during low-noise operation of the interferometer, it can be advantageous for the shutter to be sufficiently clear of the beam to avoid any noise from beam clipping. In some embodiments, to avoid beam clipping noise, any aperture can be 10 or more times the beam size ($1/e^2$ intensity). Thus in the 'open' state, the shutter's reflector can be at least 10 beam radii away from the beam center.

Shutter Lifetime. In some embodiments, the shutter can have a minimum lifetime of 10,000 cycles. This corresponds, for example, to being used (triggered) 5 times a day for 5½ years.

The TOASTR can be made using a linear electro-magnetic motor, energized with a high current pulse to drive the movable coil upwards into the beam path. FIG. 1 illustrates the basic physics concepts applied in the fast shutters of the present disclosure.

A conceptual sketch of the linear motor design for the fast shutter is illustrated in FIG. 1, as top view (102) and side view (101). The multi-turn coil is represented by a circular line (105) in side view, and also illustrated as (110) in top view. In this example, there are four rectangular permanent magnets, (115, 120). The coil (105, 110) can be wrapped on a bobbin (not shown), and free to move up and down in the gap between the two sets of magnets, i.e., along the direction indicated by the white arrow labeled 'Force' (125). The position of the coil, as shown in FIG. 1, is before any current is applied (i.e., shutter open). The low state of the fast shutter (corresponding to the unblocked optical beam, unpowered state of the shutter) corresponds to the coil windings equally overlapping the upper and lower magnets. In the up state (corresponding to the blocked optical beam, powered state of the shutter) the coil windings tend to have a greater overlap with the upper magnet. In some embodiments, the upper and lower magnets can be in contact such that the vertical spacing is zero. In some embodiments, the horizontal distance between the two upper magnets or the two lower magnets can be approximately 0.005 inches wider than the bobbin. In this way, the bobbin is well constrained in its vertical travel, experiences good electromagnetic coupling, but is also free to move vertically. In some embodiments, the bobbin thickness is 0.236 inches, therefore, the horizontal distance between magnets can be 0.241 inches.

Before the shutter is triggered (that is, with the shutter in the open state), the movable coil straddles the upper and lower pairs of magnets. At the instant the current pulse is first applied, both horizontal sections of the coil thus experience a force in the same direction. The polarity of the pulse and of the magnets is such that this force is upwards (125). As long as the coil straddles the upper and lower magnets, the force can be calculated to be:

$$F(t)=2 \cdot I(t) \cdot L \cdot B,$$

where L is the coil length, and I(t) is the total current through the coil cross section (i.e., the current times the number of turns in the coil). As the person of ordinary skill in the art will understand, standard symbols are used for indicating the exemplary orientation of the magnetic fields coming out of the FIG. 1 plane (dot symbol, 135) and into the FIG. 1 plane (cross symbol, 130).

The movement of the coil with respect of the magnet can also be seen to originate from the interaction between the equivalent magnetic moment of the coil and the magnetic field between the magnets. As can be seen in FIG. 1, the magnetic field in one region of the magnets points in one direction (130), while the magnetic field in the other region points in the opposite direction (135). The equivalent magnetic moment of the coil can be determined from the right-hand rule applied to the current flowing in the coil (105). For a general coil in a uniform magnetic field, the potential energy for a coil will be at a minimum when the equivalent magnetic moment is parallel to the magnetic field, while the anti-parallel alignment will give the maximum value for the potential energy. In other words, the minimum energy state for the coil is with its equivalent magnetic moment parallel to the direction of the field. For the fast shutter embodiment in FIG. 1, the magnetic field is in opposite directions for different regions in which the coil is free to move. Therefore, when a current pulse is applied, the coil will tend to align its moment with the upper magnets, hence the upward force. The interaction between the transient currents in the coil and the magnetic fields also gives rise to a decelerating force that permits the control of the coil position without mechanical stops during normal operation.

When no current is flowing in the coil the shutter is open. When a current pulse is applied to the coil, the equivalent magnetic moment of the coil will have an associated potential energy with the each of the two regions with opposite magnetic fields. A force will originate as a consequence, moving the coil to the new minimum energy state, and thus closing the shutter. Further, the interaction between the coil and the magnetic field can also control the upward movement of the coil by damping and stopping the movement in the closed shutter position, before hitting the mechanical stop.

From the vector orientation as illustrated in FIG. 1 for the magnetic fields in the upper and lower regions, and the current, the force can be calculated by the vector product rule from the formula $F=IL \times B$, where F is the force vector, I is the current vector, B is the magnetic field vector, and L is the length of wire within the magnetic field B. Therefore, calculating the force for the horizontal part of the coil in the lower magnet, the force will be upward. Calculating the force for the horizontal part of the coil in the upper magnet, the force will also be upward.

When the shutter is in the open position, allowing the optical beam to pass, the coil will be centered between the two upper and lower pairs of magnets, and no force will be present. When the shutter is activated with a current pulse, the coil will experience an upward force. As a result of the electromagnetic interactions with the upper pair of magnets, the current will oscillate as visible in the oscillations of FIG. 6, for example (615, 620). It can be seen from FIG. 6 that the oscillations are damped.

Under the simplified assumption that the force is constant over the travel distance of the coil, the coil has a constant acceleration, a. The nominal distance from shutter to beam in some embodiments can be 6 mm. In this example, the acceleration required to travel 6 mm in 1 ms is $a \geq 1.2 \times 10^4$ m/sec$^2$. For an exemplary total coil assembly mass of 20 g, a force of 240 N is required. Assuming, for example, L=5 cm, B=0.75 T, and 400 turns on the coil, a current of 8 amps is required. The above calculation is merely an example and different dimensions and quantities may be employed. Further, the calculation above can underestimate the values of the parameters due to dynamical effects explained below, therefore the above values can be considered as the order of magnitude of the parameters for some embodiments.

An aspect to the magnetic design of the present disclosure is the use of opposing magnetic polarizations between the upper and lower permanent magnets. The effect of these opposing fields is to provide a decelerating force that arrests the coil—without mechanical contact—at a predetermined point in its upward travel. This feature obviates the need for a dedicated mechanical stop thus eliminating mechanical damage and reducing the peak acceleration experienced during the arresting phase of operation. In some embodiments, a backup mechanical arresting feature is included to stop the coil in the event of a catastrophic malfunction, but no contact is made to the mechanical stop during normal operation.

Figure 2:
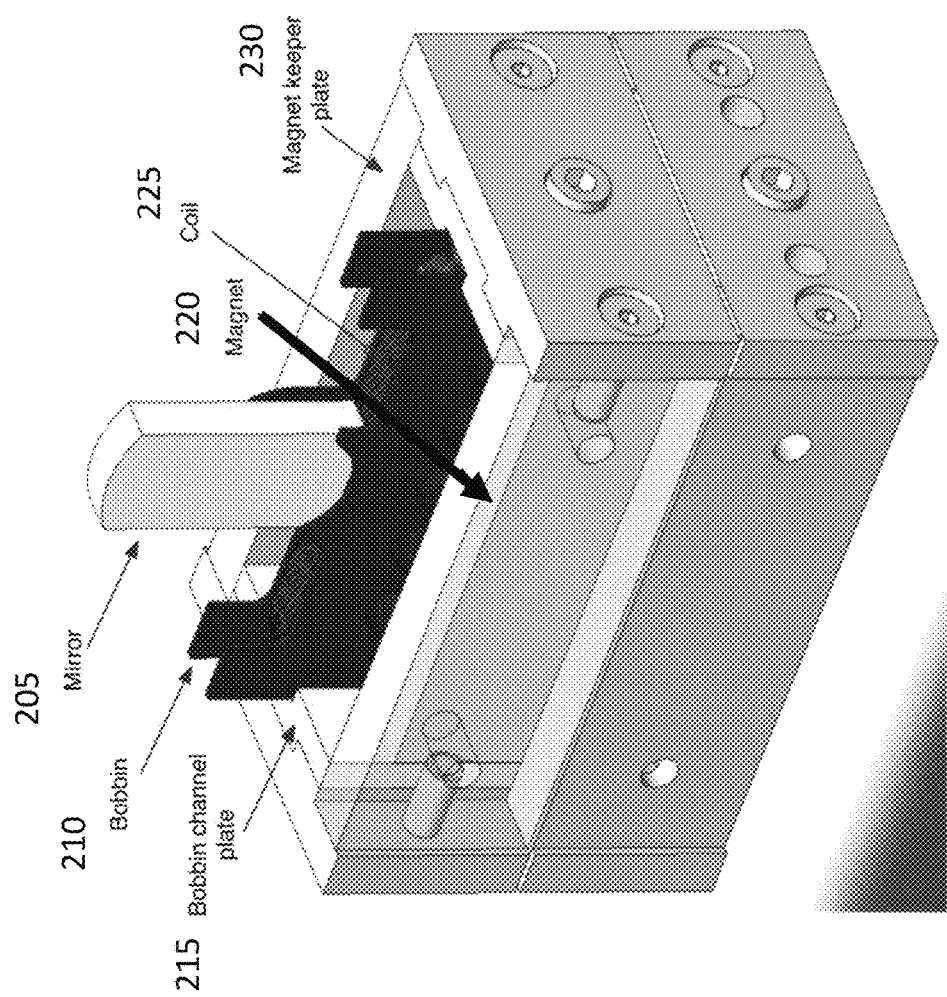
FIG. 2 illustrates an example of a linear motor assembly for the shutters.

An example of a linear motor assembly for the shutters is shown in FIG. 2. The linear motor assembly for the TOASTR of FIG. 2 comprises a mirror (205), for example an ion-beam sputtered high-reflector (fused silica substrate). The bobbin (210) and bobbin channel plates (215) are, in this example, made of polyether ether ketone (PEEK), while the magnets (220) are NdFeB and the magnet keeper plates (230) are nickel-plated 1018 cold roll steel.

Figure 3:
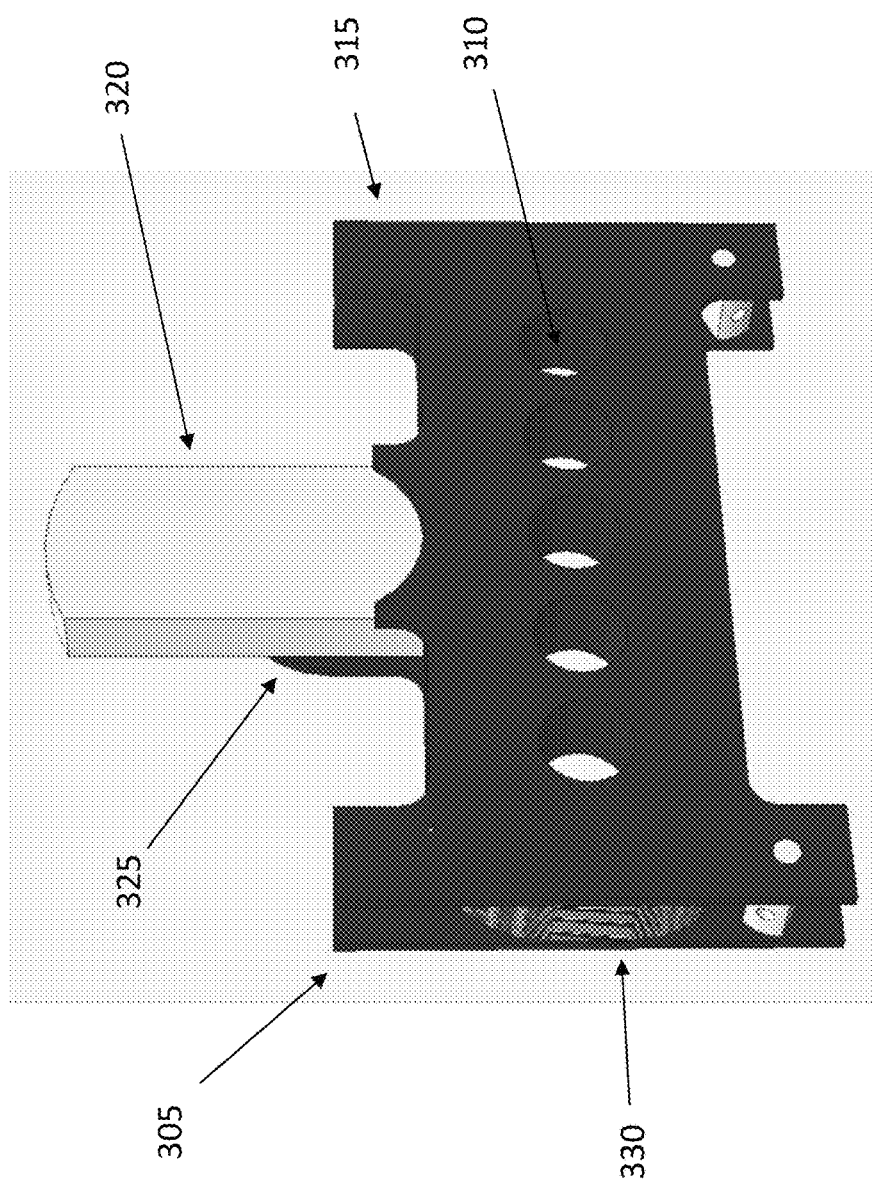
FIG. 3 illustrates an exemplary coil assembly.

An exemplary coil assembly is shown in FIG. 3. For this example, its mass parameters are as follows: PEEK bobbin, 3.18 g; mirror, 2.58 g; copper 32 awg, 23 Ohms, 12.25 g.

In the exemplary TOASTR coil assembly of FIG. 3, the coil form (bobbin, 305) is made of PEEK, and is drilled out in the center (310) to reduce mass. The ends of the bobbin (315) are made wider to provide more stability for travel within the channel plates (not shown). The mirror (320) is made from a 1" diameter off-the-shelf mirror, ground down in thickness for fitting, and in width to reduce mass. The mirror (320) can be bonded to a tab on the bobbin (325) using EP30-2 epoxy. The coil (330) is wound using 32 awg, polyimide-insulated copper wire. The coil (330) is potted during the winding process, using Epoxy Pax EP 1730-1. The coil (330) has approximately 300 turns. The person of ordinary skill in the art will understand that different types of wire, number of windings, glue and components could be used in the assembly of the coil while maintaining similar operational parameters.

For an exemplary beam radius of 0.5 mm, the lock-loss pulse energy density can be as high as 5000 J/cm². This value is well into the regime of laser drilling (melting and vaporization) of materials. For alumina ceramic (a high melting point material), a 'machining threshold' can be about 750 J/cm². Therefore, the approach of absorbing the laser pulse with some material on the shutter can be difficult. Instead, the solution of the present disclosure is to reflect the pulse with a mirror, and direct it into a dump that is capable of absorbing the pulse energy.

A high-reflectivity dielectric mirror made using ion-beam sputtering (IBS) can be able to handle the pulse energy. IBS coatings are typically sold as having damage thresholds of more than 40 J/cm² at 1064 nm, but these coatings are for much shorter pulses, about 20 nsec. Damage threshold scales as (pulse duration)$^{1/2}$, but still applicable for short pulses (less than 100 nsec). For a 10 ms pulse, it can be more appropriate to consider continuous wave (CW) damage thresholds, which can be greater than 17.6 MW/cm², compared to a peak intensity in the lock-loss pulse of about 2 MW/cm². Therefore, an IBS coated HR mirror can be able to handle pulses in the typical operation range at LIGO with no damage.

Figure 4:
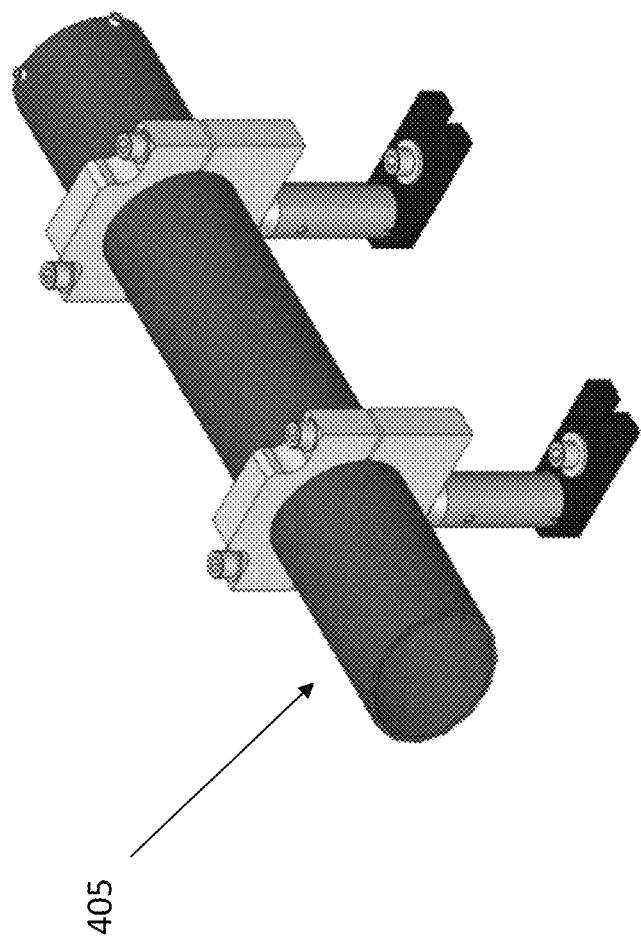
FIG. 4 illustrates an example of a beam dump.

In some embodiments, the reflected laser pulse can be directed to a beam dump: for example, a copper tube, gold-coated to increase the reflectivity and avoid oxidation of the copper. An example of a beam dump is illustrated in FIG. 4. FIG. 4 illustrates a gold-coated a copper tube (405). In some embodiments, the tube (405) is 12" long and has a 2" diameter. The local heating of the dump can be analyzed as follows. In some embodiments, the peak power of the pulse is 8.5 kW. For a beam radius of 0.6 mm, incident at 45 deg, the maximum intensity is: $I_m=2P_{max}/\sqrt{2\pi}\omega^2=1.1\times10^{10}$ W/m². The surface temperature of an absorbing material, for a temporally Gaussian laser pulse, is given (see J. H. Bechtel, *Heating of solid targets with laser pulses*, J. Appl. Phys. 45, 1585 (1975), the disclosure of which is incorporated herein by reference in its entirety) as:

$$\Delta T(t) = \frac{I_m(1-R)}{(\kappa\rho c)^{1/2}} \frac{\tau^{1/2}}{2^{1/4}} \eta(t/\tau)$$

where κ, ρ, c and R are the thermal conductivity, density, heat capacity, and reflectivity of the material, respectively; T is the Gaussian pulse half-width; and η contains the temporal evolution of the temperature, and has a maximum value of 1.5. In some embodiments, T=3 ms. Using the known material properties of copper, the max temperature rise is: ΔT=(1−R)·18,000° C. With a gold coating, R>98%, and ΔT<360° C., safely below the melting point of both gold and copper.

Figure 5:
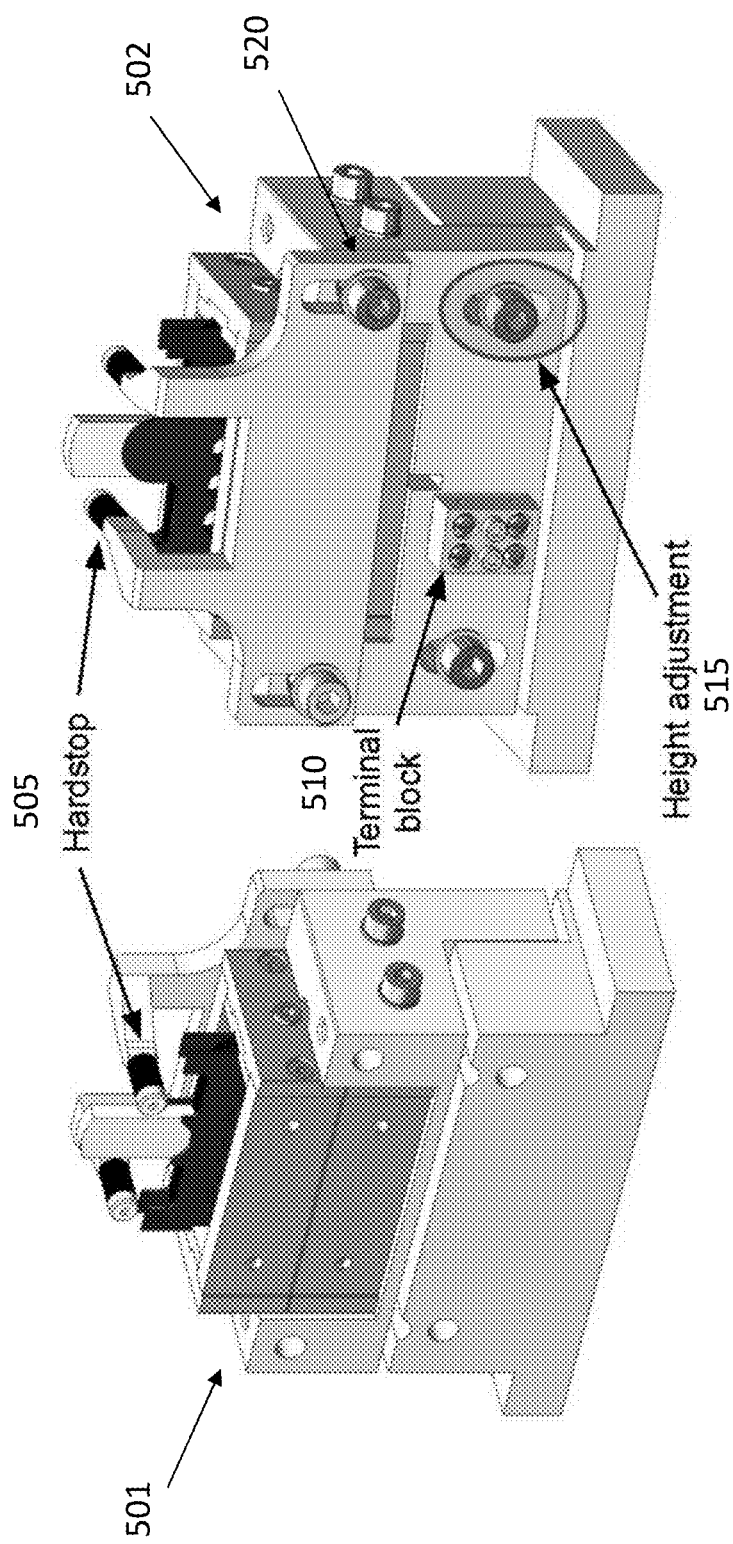
FIG. 5 illustrates an exemplary full shutter assembly.

An exemplary full TOASTR assembly is illustrated in FIG. 5. In some embodiments, there are no sensors included in the TOASTR, for simplicity of fabrication. In the exemplary deployment at LIGO, the interferometer (PSL) laser beam and the trigger detector in HAM6 can be used to diagnose the position and functioning of the shutter.

The TOASTR assembly in FIG. 5 illustrates a front view (501) and a back view (502). The coil assembly is shown in FIG. 5 in the 'up/closed' position. The coil wires (not shown) are connected to the PEEK terminal block; the other side of the terminal block (510) is fed with the drive cable (not shown) coming from the chamber feedthrough. The height of the linear motor assembly is adjustable as shown in FIG. 5 (515, 520). The adjustable hard-stop (505) can be provided as a backup mechanism (the black cylinders are Viton tubing); in normal operation, the coil assembly does not contact the hard stop (505). For example, height adjustments (515, 520) can be through hex bolts and washers that tighten within slots.

Figure 6:
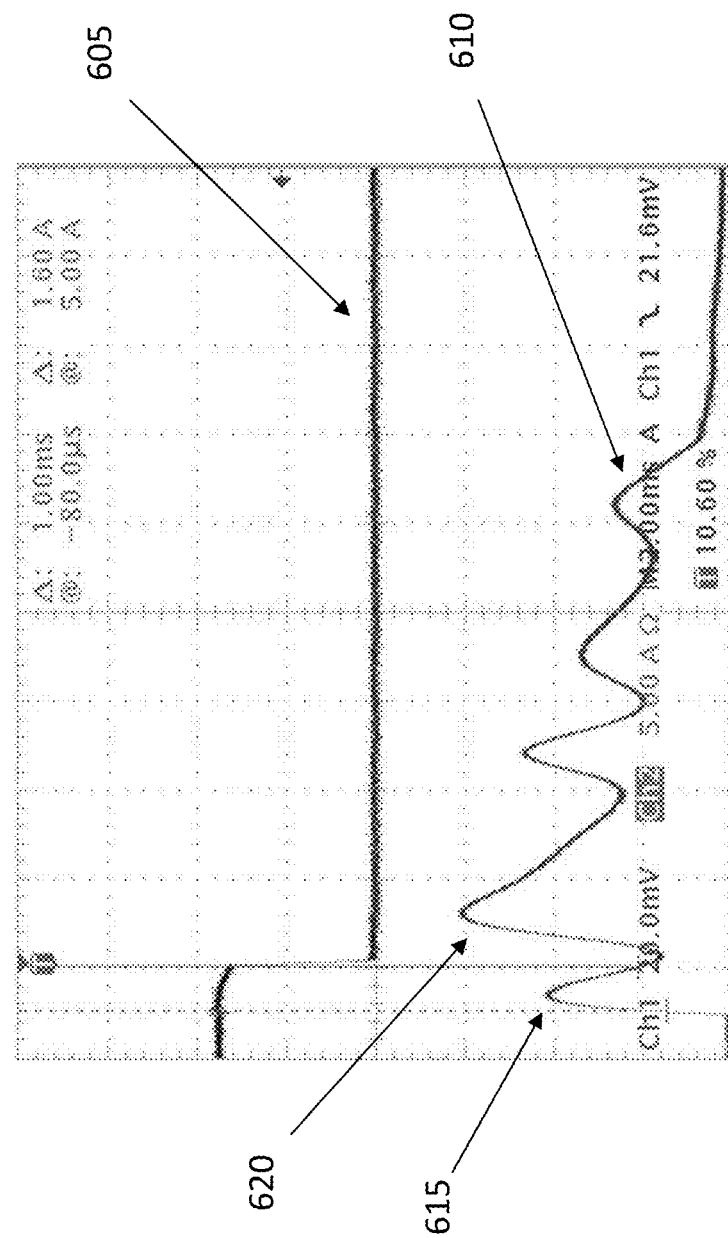
FIG. 6 illustrates optical gate and motor current data.

FIG. 6 illustrates the optical gate state (605), with low signal being the blocked state for the shutter, and the motor current (610). The motor current (610) essentially maps out the acceleration of the motor windings (bobbin) within the permanent magnetic field. The first peak (615) corresponds to an upwards acceleration transient, the second peak (620) corresponds to a negative acceleration (slowing down) in the opposite polarity magnetic field.

Figure 7:
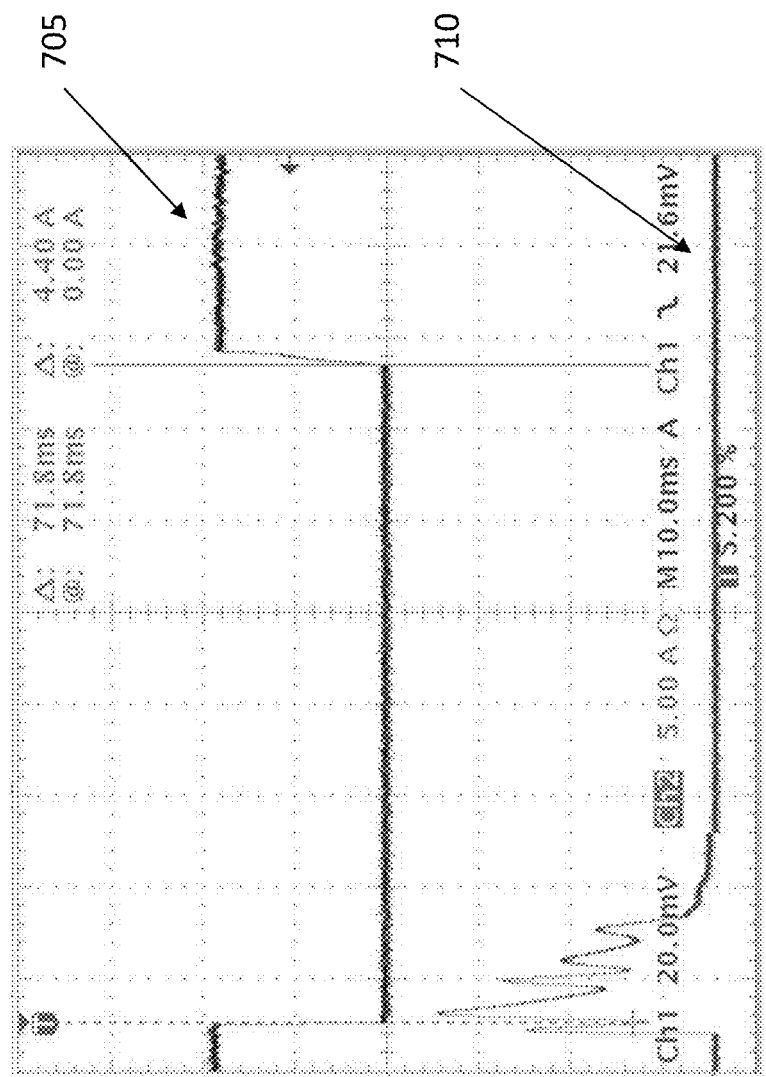
FIG. 7 illustrates data on the operation of the shutter.

FIG. 7 illustrates how the shutter blocks light (705), with the low state being the blocked state for the shutter, indefinitely without mechanically overshooting and permitting light to once again pass when in the open state.

Figure 8:
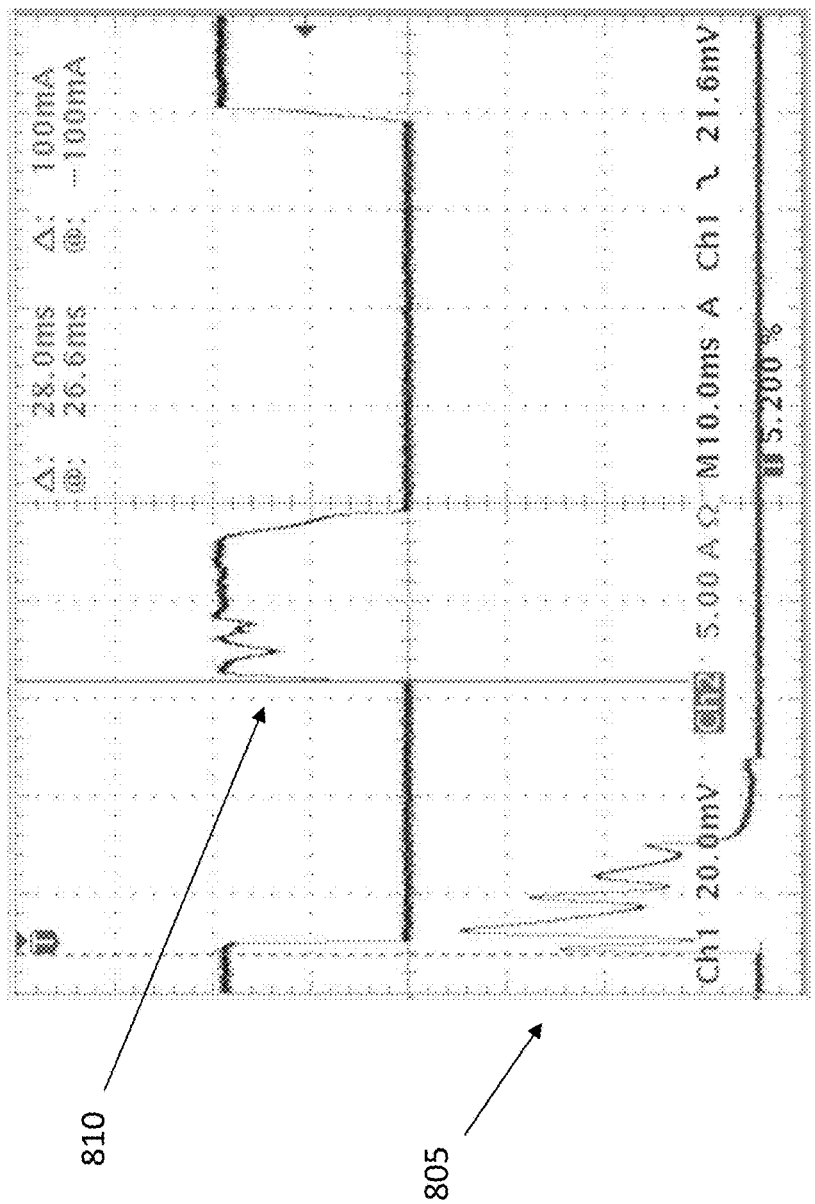
FIG. 8 illustrates an operational state of the shutter.

FIG. 8 illustrates an operational state of the shutter. Deliberately shortening the applied pulse (805) can result in overshoot as the dynamic response of the shutter is changed. Light can be seen once again passing the shutter (810).

Figure 9:
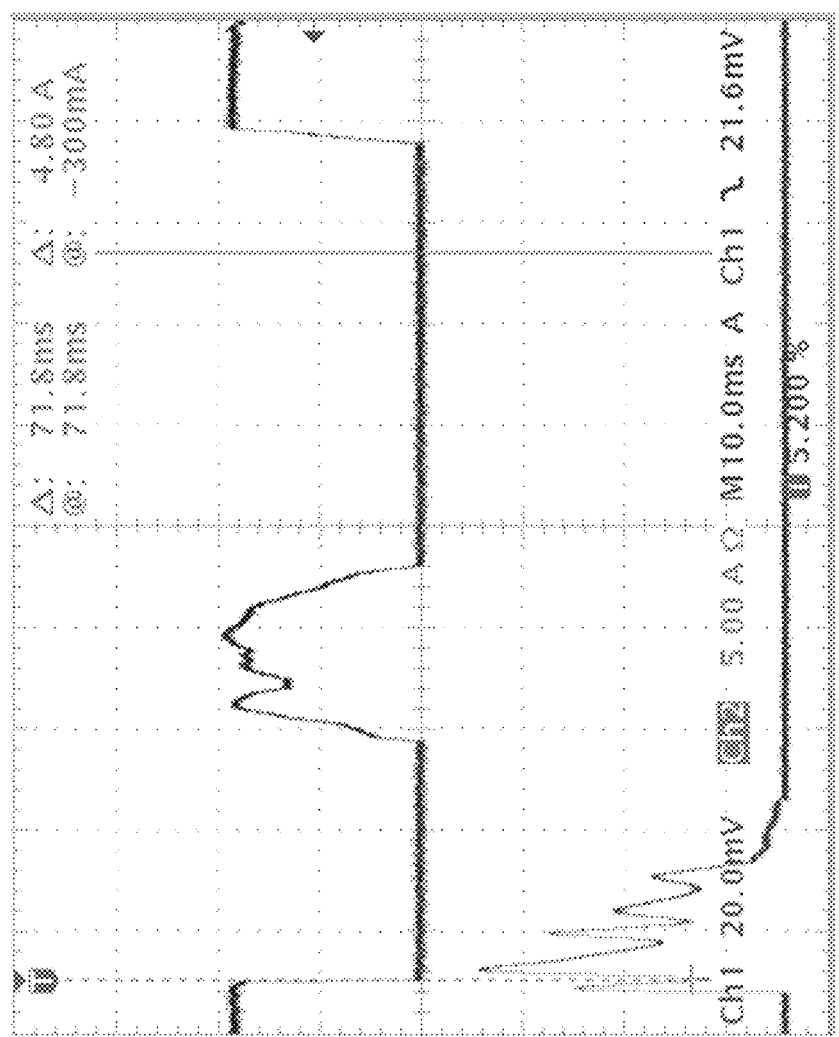
FIG. 9 illustrates the variability of the dynamics by pulse width tailoring.

FIG. 9 illustrates the variability of the dynamics by pulse width tailoring. FIGS. 6 to 9 are at atmospheric pressure.

The measured dynamics of the shutter in the absence of air can be considerably different than operation at atmospheric pressure. A large amount of viscous damping can be provided by the suction effect of the shutter bobbin as it rises out of the slot from a resting position. This effect is akin to pulling a boot out of mud and results in a far more oscillatory dynamic response than that which could be expected without the presence of this effect. Mitigation of this effect can be obtained by adding resistive damping (for example, 20 ohms) to the pulse driver circuitry. In this way, the addition of the resistance (for example, a 20 Ohm source resistance) restores the damping previously provided by air, and compensates the dynamic behavior. In addition, a carefully chosen pulse width can be crafted to shut off the drive at just the right moment leaving the bobbin in a stable position. As considerable current is flowing at the moment in which the current is shut off, a large voltage spike can be induced. For example, the spike could be several hundred Volts. This voltage spike can be clamped by use of, for example, a diode clamping circuit. The end result is that effective shuttering can be obtained under vacuum, even in the absence of the damping effect of air. In some embodiments, the final measured shutter speed in the damped configuration can be about 1.9 milliseconds to full closure, under vacuum. In some embodiments, the vacuum is ultra-high vacuum, that is less than $10^{-8}$ Torr.

Figure 10:
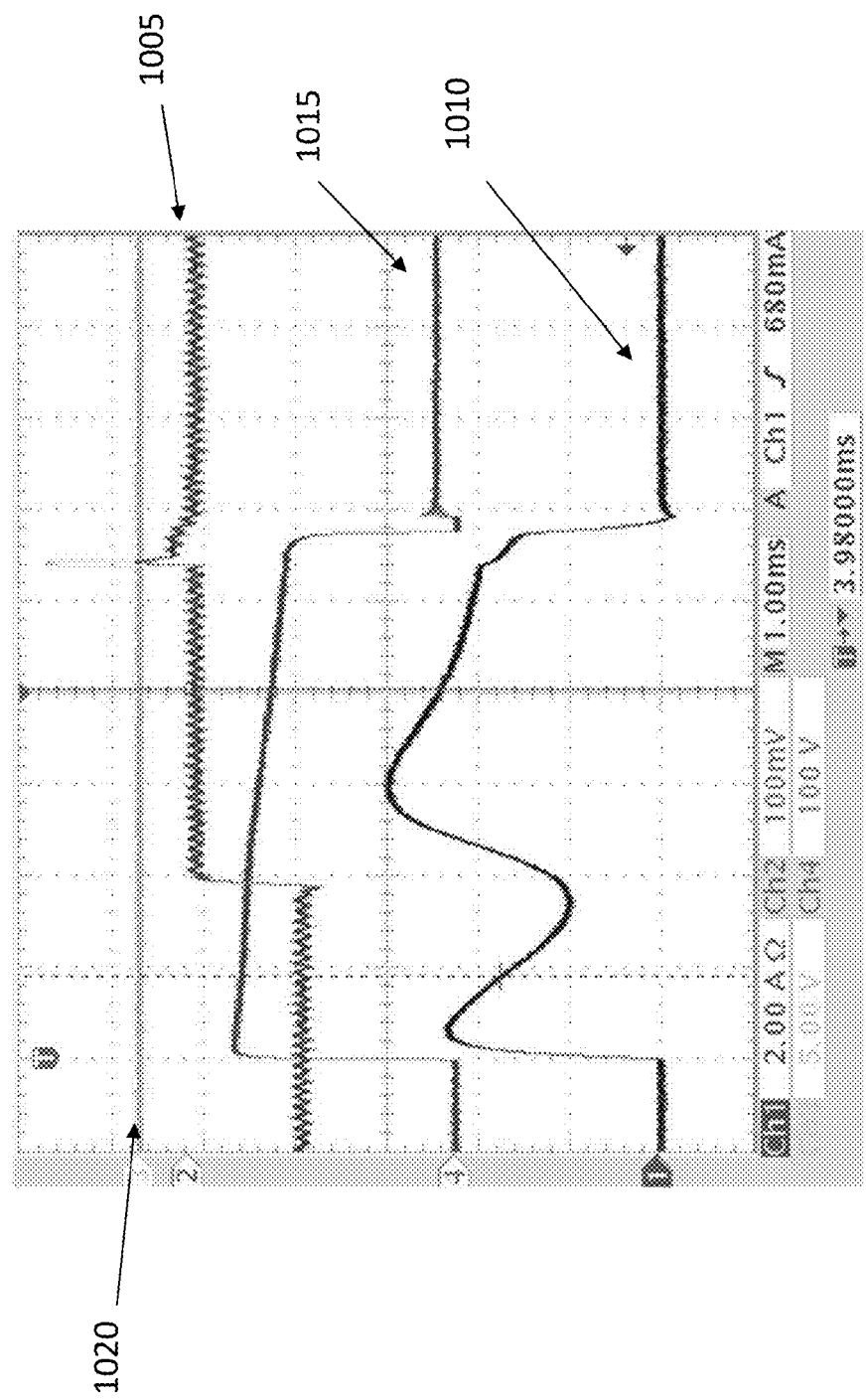
FIG. 10 illustrates an exemplary operation of the shutter under vacuum.

FIG. 10 illustrates an exemplary operation of the shutter under vacuum. Trace (1005) shows the optical gated signal, with the lower state corresponding to the bright condition. Trace (1010) is the current flowing through the shutter coil. Trace (1015) shows the applied coil voltage. Trace (1020) is an internal logic signal. It can be seen from FIG. 10 that the current pulse is terminated while approximately 4 Amperes are flowing through the coil. The negative-going inductive kick is effectively clamped, but visible in trace (1015). An anomalous glitch is seen in the optically derived signal, trace (1005) around the time the pulse is terminated. The anomalous glitch is related to crosstalk in the test setup of FIG. 10 and is not a real optical feature. Demonstrated shutter time in the test of FIG. 10 is about 1.9 ms from the leading edge of the applied pulse in trace (1010) to the rising edge of the optical gate.

By varying the applied pulse width, operating voltage, source impedance, and total energy storage capacitance internal to the driver electronics, the dynamic behavior of the motor coil can be tailored. Dynamic tuning can therefore be provided for the shutters. The capture transients seen in FIG. 10 (1005) as well as FIGS. 6-9, have an oscillatory nature. The stiffness of the electromechanical spring can be adjusted by changing the applied voltage within the driving pulse. The circuitry that drives the coil has an electrical source impedance that provides some damping to the coil even after termination of the applied pulse. Additional resistive damping can be added to the driver circuit to provide mechanical compensation as needed at the expense of shutter speed. As can be seen by comparison of FIG. 7 to FIGS. 8-9, tuning of these parameters provides a clear region of time (for example about 71 ms in FIG. 7) during which the shutter effectively remains in the blocked state.

The pulse driver electronics has the ability to provide a low current hold state that can maintain the shutter in the blocked state indefinitely after termination of the fast, high current transient.

Figure 11:
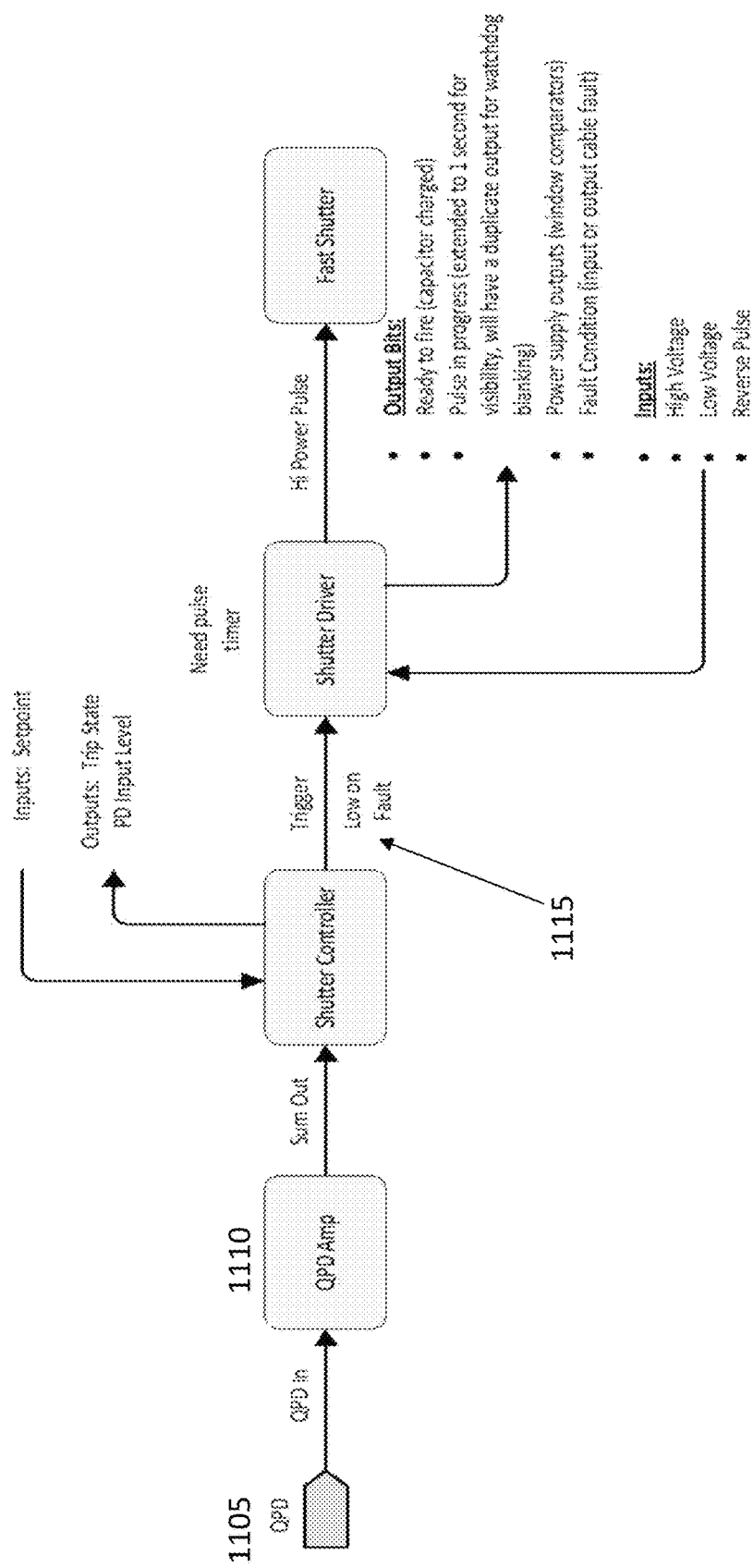
FIG. 11 illustrates an exemplary signal chain of the fast shutter.

The TOASTR is a hardware shutter. In some embodiments, the signal chain of the fast shutter can be as illustrated in FIG. 11. The shutter driver is designed to indicate a fault condition if either its input or output cable is disconnected. The detector used for triggering, in the embodiment employed at LIGO, is ASC-AS_C: the quad photodetector (QPD, 1105) in HAM6 that receives a sample of the light transmitted by OM1 (first optic in the HAM6 chain). This QPD is connected to a version of the QPD transimpedance amplifier (D1002481, 1110) that includes quadrant-sum output channels on the chassis (uses v5 of the amplifier board, D1001974); this sum output is used to generate the trigger signal (1115) for the shutter.

In the embodiment employed at LIGO, the QPD amp sum output is sent into a standard LIGO shutter controller: D1102312. The shutter controller generates a trigger output when the input signal (QPD sum) reaches a threshold; the threshold level is controlled from the EtherCAT system. The trigger output is sent to the shutter driver, which generates the current pulse applied to the TOASTR coil.

Figure 12:
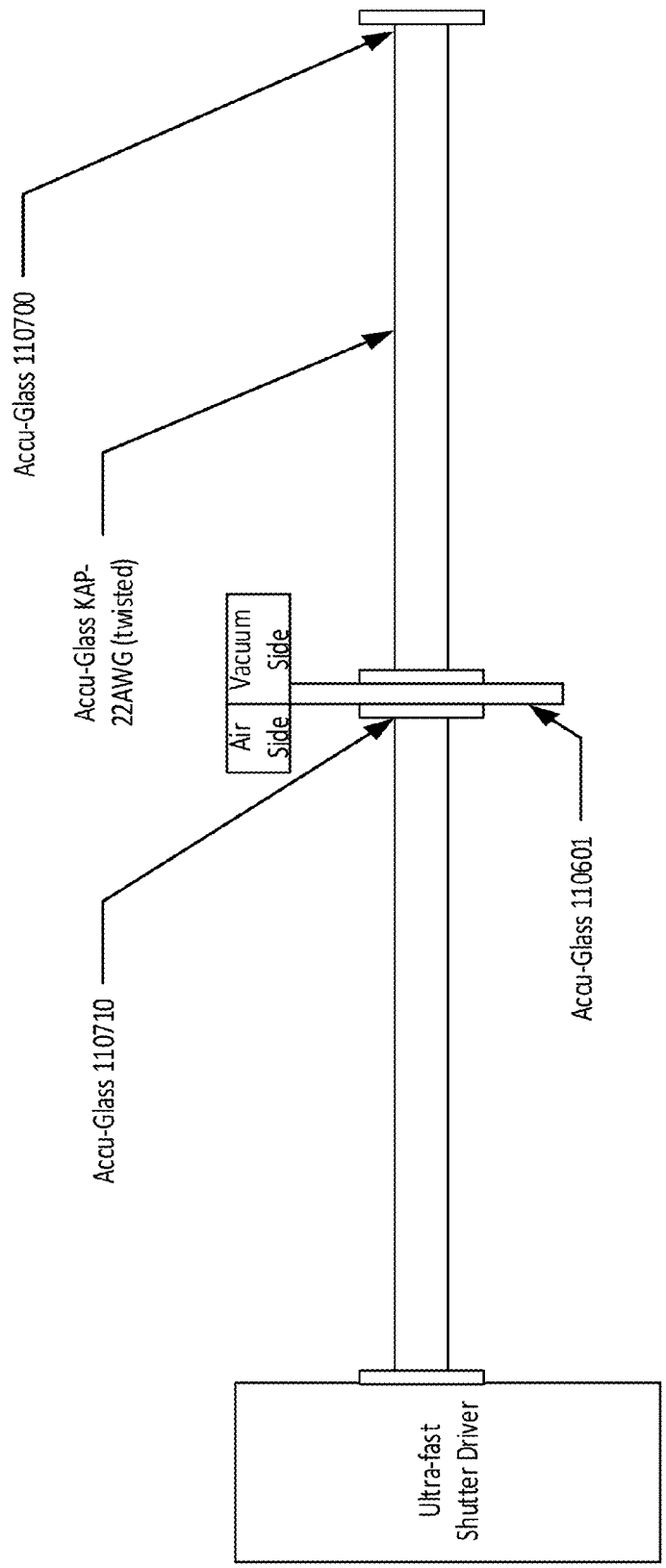
FIG. 12 illustrates electrical cabling for the fast shutter.
Figure 13:
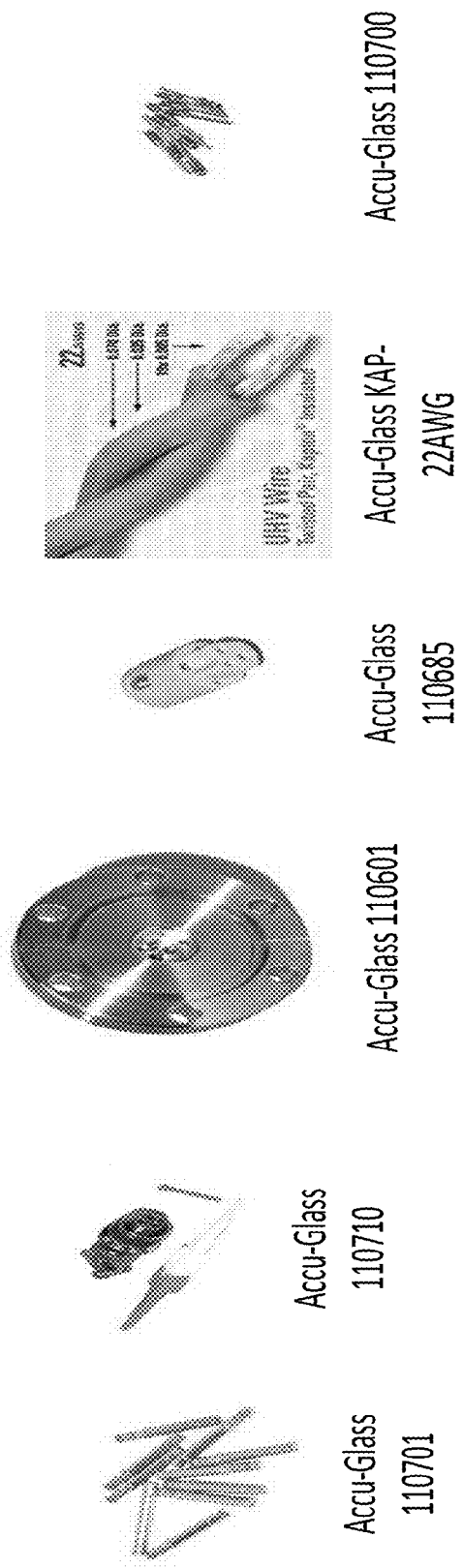
FIG. 13 illustrates exemplary components for the fast shutter electrical cabling.

FIG. 12 illustrates electrical cabling for the fast shutter. FIG. 13 illustrates exemplary components for the fast shutter.

In the present disclosure an electro-mechanical shutter is described. The fast operation is based on a coil operated via a current, where the coil can move within a set of magnets to provide opening and closing of a shutter. The shutter can comprise a mirror connected to the coil, so that the mirror can be moved into the path of an optical beam. The mirror can block the beam light in the closed state, and allow the beam light in the open state. The beam light can be laser light.

In alternative embodiments, the mirror, or more than one mirror, may be attached to two or more coils instead of a single coil. In some embodiments, the bobbin has a weight of between 3 and 4 g, the mirror has a weight between 2 and 3 g, and the copper wire has a resistance of 23 Ohms and a total weight of between 12 and 13 g. In some embodiments, multiple coil windings can be added, each serving separate functions. For example, a main coil can provide the fast acceleration needed for rapid actuation, and a secondary coil can be employed to give further adjustments to the damping and overshoot intrinsic to this topology.

Figure 14:
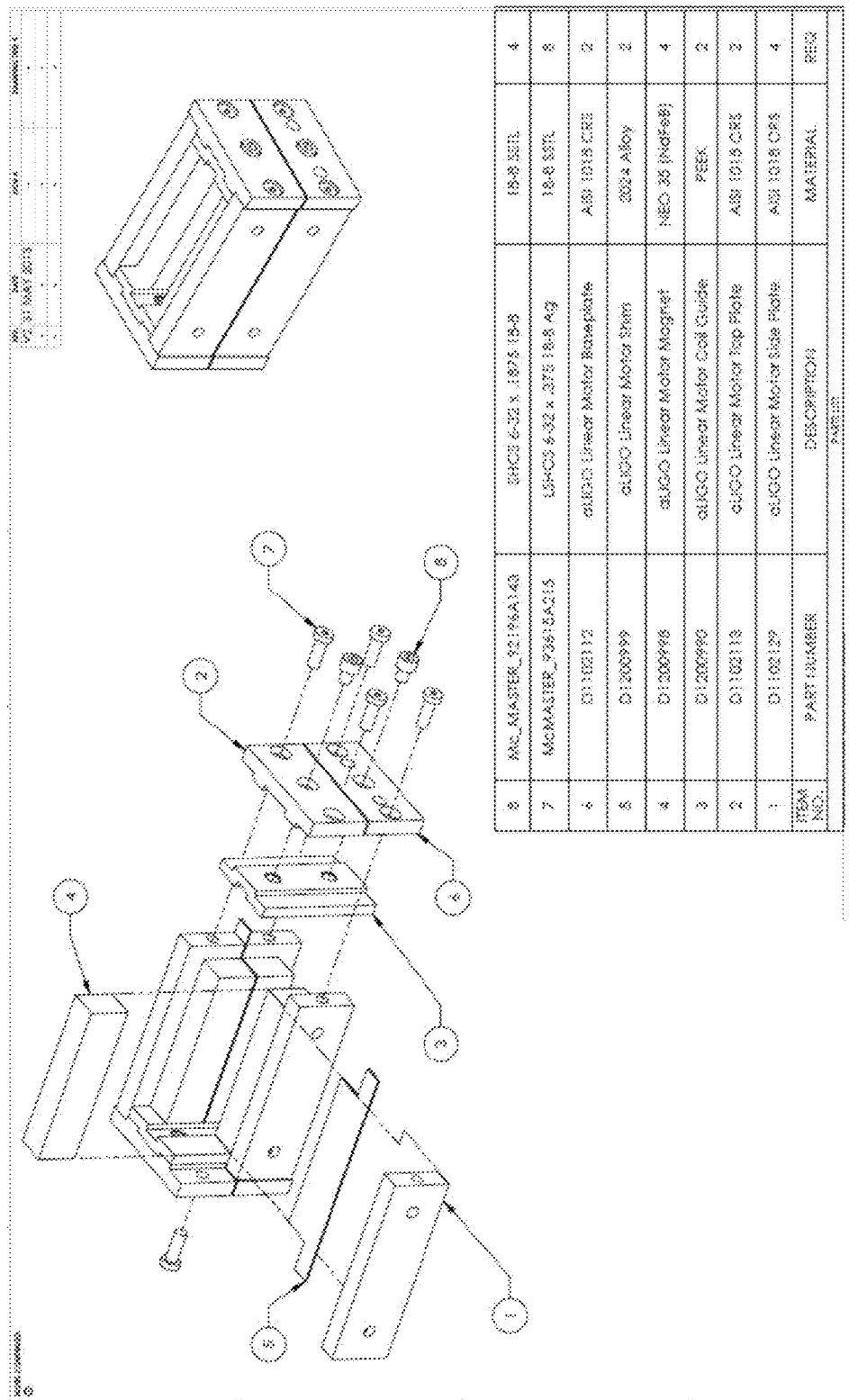
FIG. 14 illustrates an exploded view of an embodiment of a fast shutter.

FIG. 14 illustrates an exploded view of an embodiment of a fast shutter.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. An electro-mechanical device comprising:
   at least one first magnet configured to provide a first magnetic field in a first direction in an upper part of the electro-mechanical device;
   at least one second magnet configured to provide a second magnetic field in a second direction in a lower part of the electro-mechanical shutter, wherein the second direction is opposite to the first direction;
   at least one coil, comprising windings of electrically conducting wires, the at least one coil configured to move between the upper part and the lower part of the electro-mechanical device;
   a circuit electrically connected to the at least one coil and configured to apply a current pulse to the at least one coil; and
   at least one mirror attached to the at least one coil, wherein:
   the electro-mechanical device is an electromechanical shutter,
   the at least one mirror is configured to move between an open shutter position and a closed shutter position upon application of the current pulse, the open shutter position corresponding to the at least one mirror not intersecting an optical beam, and the closed shutter position corresponding to the at least one mirror completely intersecting the optical beam,
   the current pulse is configured to stop the at least one coil in the closed shutter position, and
   the at least one coil comprises a bobbin made of polyether ether ketone, drilled in the center to reduce mass.

2. The electro-mechanical device of claim 1, wherein the at least one first magnet comprises two first parallelepiped magnets parallel to each other with a first space inbetween, and the at least one second magnet comprises two second parallelepiped magnets parallel to each other and to the two first parallelepiped magnets with a second space inbetween, and wherein the at least one coil is configured to move within the first and second spaces.

3. The electro-mechanical device of claim 1, further comprising a mechanical stop in the upper region of the electro-mechanical shutter, the mechanical stop configured to stop the at least one coil in the closed shutter position upon failure of an electro-mechanical operation.

4. The electro-mechanical device of claim 3, wherein the mechanical stop has adjustable means to adjust a maximum height for the at least one coil in the closed shutter position.

5. The electro-mechanical device of claim 1, wherein the at least one first magnet and the at least one second magnet are made of NdFeB.

6. The electro-mechanical device of claim 1, further comprising magnet keeper plates configured to mechanically support the at least one first magnet and the at least one second magnet, wherein the magnet keeper plates are made of nickel-plated 1018 cold roll steel.

7. The electro-mechanical device of claim 1, wherein the at least one mirror is bonded to a tab on the bobbin using EP30-2 epoxy and the at least one coil is wound using 32 awg, polyimide-insulated copper wire.

8. The electro-mechanical device of claim 7, wherein the bobbin has a weight of between 3 and 4 g, the mirror has a weight between 2 and 3 g, and the copper wire has a resistance of 23 Ohms and a total weight of between 12 and 13 g.

9. The electro-mechanical device of claim 1, wherein the current pulse is configured to have a specified width.

10. The electro-mechanical device of claim 1, wherein the circuit comprises resistive damping configured to control movement of the at least one coil under vacuum operation.

11. The electro-mechanical device of claim 1, wherein the at least one mirror is configured to reflect a 45 J optical beam.

12. The electro-mechanical device of claim 1, further comprising a beam dump configured to absorb energy from an optical beam reflected by the at least one mirror.

13. An electro-mechanical device comprising:
   at least one first magnet configured to provide a first magnetic field in a first direction in an upper part of the electro-mechanical device;
   at least one second magnet configured to provide a second magnetic field in a second direction in a lower part of the electro-mechanical shutter, wherein the second direction is opposite to the first direction;
   at least one coil, comprising windings of electrically conducting wires, the at least one coil configured to move between the upper part and the lower part of the electro-mechanical device;
   a circuit electrically connected to the at least one coil and configured to apply a current pulse to the at least one coil; and
   at least one mirror attached to the at least one coil, wherein:
   the electro-mechanical device is an electromechanical shutter,
   the at least one mirror is configured to move between an open shutter position and a closed shutter position upon application of the current pulse, the open shutter position corresponding to the at least one mirror not intersecting an optical beam, and the closed shutter position corresponding to the at least one mirror completely intersecting the optical beam,
   the current pulse is configured to stop the at least one coil in the closed shutter position, and
   the at least one mirror is an ion-beam sputtered high-reflector mirror with a fused silica substrate.

14. An electro-mechanical device comprising:
   at least one first magnet configured to provide a first magnetic field in a first direction in an upper part of the electro-mechanical device;
   at least one second magnet configured to provide a second magnetic field in a second direction in a lower part of the electro-mechanical shutter, wherein the second direction is opposite to the first direction;
   at least one coil, comprising windings of electrically conducting wires, the at least one coil configured to move between the upper part and the lower part of the electro-mechanical device;
   a circuit electrically connected to the at least one coil and configured to apply a current pulse to the at least one coil; and
   at least one mirror attached to the at least one coil, wherein:
   the electro-mechanical device is an electromechanical shutter, the at least one mirror is configured to move between an open shutter position and a closed shutter position upon application of the current pulse, the open shutter position corresponding to the at least one mirror not intersecting an optical beam, and the closed shutter position corresponding to the at least one mirror completely intersecting the optical beam, the current pulse is configured to stop the at least one coil in the closed shutter position, and the at least one coil, the at least one first magnet, the at least one second magnet and the current pulse are configured for the electro-mechanical shutter to be 90% closed within 1 ms of being triggered, and 99.9% closed within 2 ms of being triggered.

15. An electro-mechanical device comprising:

at least one first magnet configured to provide a first magnetic field in a first direction in an upper part of the electro-mechanical device;

at least one second magnet configured to provide a second magnetic field in a second direction in a lower part of the electro-mechanical shutter, wherein the second direction is opposite to the first direction;

at least one coil, comprising windings of electrically conducting wires, the at least one coil configured to move between the upper part and the lower part of the electro-mechanical device;

a circuit electrically connected to the at least one coil and configured to apply a current pulse to the at least one coil; and at least one mirror attached to the at least one coil, wherein:

the electro-mechanical device is an electromechanical shutter, the at least one mirror is configured to move between an open shutter position and a closed shutter position upon application of the current pulse, the open shutter position corresponding to the at least one mirror not intersecting an optical beam, and the closed shutter position corresponding to the at least one mirror completely intersecting the optical beam, the current pulse is configured to stop the at least one coil in the closed shutter position, and a total coil assembly mass is 20 g, the at least one coil has a length of 5 cm, a magnetic field applied to the at least one coil is 0.75 T, and the at least one coil has 400 turns.

16. An electro-mechanical device comprising:

at least one first magnet configured to provide a first magnetic field in a first direction in an upper part of the electro-mechanical device;

at least one second magnet configured to provide a second magnetic field in a second direction in a lower part of the electro-mechanical shutter, wherein the second direction is opposite to the first direction;

at least one coil, comprising windings of electrically conducting wires, the at least one coil configured to move between the upper part and the lower part of the electro-mechanical device;

a circuit electrically connected to the at least one coil and configured to apply a current pulse to the at least one coil;

at least one mirror attached to the at least one coil; and a beam dump configured to absorb energy from an optical beam reflected by the at least one mirror, wherein:

the electro-mechanical device is an electromechanical shutter, the at least one mirror is configured to move between an open shutter position and a closed shutter position upon application of the current pulse, the open shutter position corresponding to the at least one mirror not intersecting an optical beam, and the closed shutter position corresponding to the at least one mirror completely intersecting the optical beam, the current pulse is configured to stop the at least one coil in the closed shutter position, and the beam dump comprises a gold-coated copper tube.

17. The electro-mechanical device of claim 16, wherein the gold-coated copper tube is 12" long and has a 2" diameter.

* * * * *